Aug. 26, 1941.   W. HAUG   2,253,904
PACKING RING
Filed Nov. 30, 1937   2 Sheets-Sheet 1

Inventor:
Wilhelm Haug
by *(signature)*
Attys.

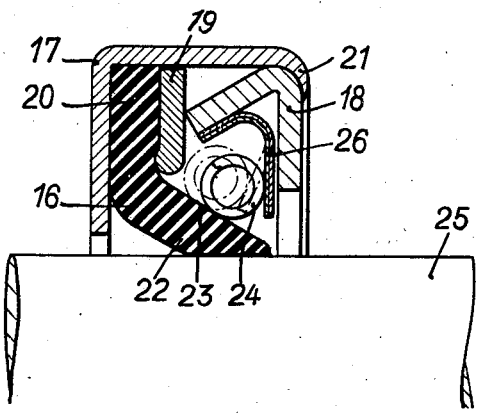
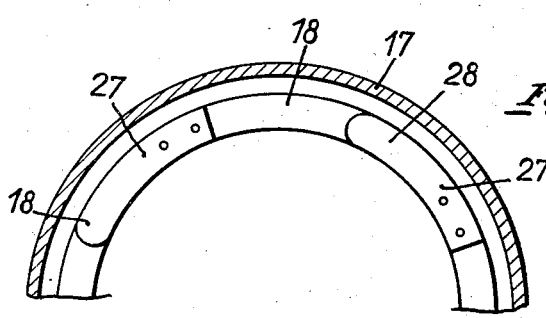
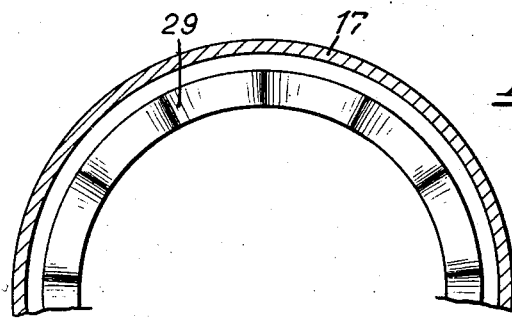

Patented Aug. 26, 1941

2,253,904

UNITED STATES PATENT OFFICE 2,253,904

PACKING RING

Wilhelm Haug, Heilbronn-on-the-Neckar, Germany, assignor to Kupper-Asbest-Co. Gustav Bach, Heilbronn-on-the-Neckar, Germany Application November 30, 1937, Serial No. 177,206
In Germany December 7, 1936

7 Claims. (Cl. 288—3)

My invention relates to packings and more especially to packing rings for use in connection with rotating shafts.

It is an object of this invention to provide a packing ring for shafts, which is particularly suitable for sealing the gap between the shaft and the bearing or the like at any number of revolutions of the shaft and regardless of the magnitude of the turning moment transmitted.

In packing rings such as hitherto in use in connection with rotating shafts, which can simply be mounted on the shaft, chrome-tanned leather has been used as packing material. These rings can however be used only below a predetermined number of revolutions of the shaft, since, if this number of revolutions is overstepped, the leather at that portion of the ring, which effects the sealing, becomes hard and is even liable to charring. In connection with shafts running at higher speed synthetic rubber may be used as packing material, however here also care must be taken not to overstep a certain speed, since the friction, which is converted into heat at the sealing portion of the rubber and influences its mechanical properties, changes in proportion to the speed.

In the packing rings according to this invention the pressure exerted by them onto the shaft is rendered automatically variable by keeping the frictional strain uniform under varying conditions of operation or influencing same in a predetermined manner. Any reduction of the pressure occurring at higher speed results in lower friction which is admissible since a high pressure exerted by the packing on the shaft is required only when the shaft is at rest or revolves slowly, but not at high speed.

According to this invention the pressure is rendered directly dependent on the work to be transmitted by causing the rise in temperature of the lubricant or other agent, which shall be retained by the packing, which rise is brought about by the conversion of friction into heat, for instance in a gearing, to act on the packing, by means of a heat responsive bimetallic member, in such manner that the pressure exerted by the packing on the shaft rises or drops in dependency on temperature. I am thus enabled to keep the frictional heat, which varies in proportion to the pressure and speed, constant also under varying conditions of operation or to make it rise or drop in a predetermined manner.

With resilient shafts an action of the bimetallic members may be desirable whereby the operative portion of the packing ring is pressed onto the shaft more strongly at rising speed.

The packing ring or sleeve can either be combined directly with the bimetallic member or it may be pressed, in a manner known per se, against the shaft by means of an annular coil spring which is so influenced by a bimetallic member that the tension of, and the pressure exerted by, the spring on the operative portion of the packing sleeve or ring are automatically varied in dependency on temperature. To this end the spring may for instance rest on a conical surface of the packing ring and be displaced by the bimetallic member along this surface, being tensioned and relieved more or less according to the direction of movement. In another arrangement of the parts the spring tension may, in proportion to a rise of temperature, rise or drop. In the first case, when the machine is started, the spring may rest loosely or under low tension in the casing, the packing sleeve or ring contacting the shaft without any material pressure. As the temperature rises, the spring is placed under tension by the expanding bimetallic member and the operative portion of the sleeve or ring is now pressed against the shaft with rising pressure. In this manner the danger of the sleeve or ring running dry is greatly diminished.

Inversely if the bimetallic member is arranged to act in the opposite direction, the pressure exerted by the spring on the operative portion of the sleeve or ring drops in proportion as the temperature rises. In this case the sleeve or ring may be used at very high speeds without any inadmissible friction occurring.

The packing according to this invention renders it possible to use synthetic rubber as packing material up to the highest speeds. Therefore the admissible maximum speed may for instance be raised from 600 m./min. to about 1000 m./min. without any danger.

The packing ring or sleeve itself may consist of any suitable material, for instance of natural or synthetic rubber or leather etc.

In the drawings affixed to this specification and forming part thereof packings for shafts embodying my invention are illustrated diagrammatically by way of example.

In the drawings:

Figs. 1, 2 and 3 are axial sections of three different modifications, while

Fig. 5 is an axial section of a packing comprising a coil spring.

Figs. 6 and 7 are end views of two similar modifications.

Figure 1:
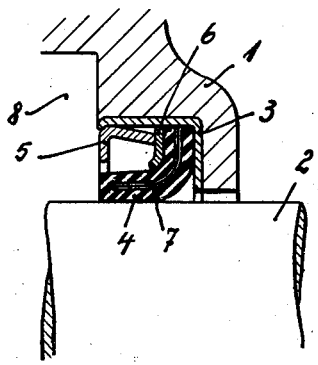

Referring to the drawings and first to Fig. 1, 1 is the part, to be packed, of an engine or machine and 2 is the shaft. The packing comprises an annular casing 3, a sleeve shaped ring 4 consisting of synthetic rubber being mounted in this casing in such manner, that its radially extending outer portion is pressed against the radial wall of the casing by the spacing ring 5 and a pressure ring 6, while the axial portion of the sleeve, which is the operative portion, is applied against the circumference of the shaft. The packing sleeve is doubled up, as shown in the drawings and encloses between its halves a number of bimetallic strips 7, which are firmly secured in the sleeve at their radially outer ends by the pressure ring 6, while their free ends exert an elastic pressure on the sleeve, which is thus pressed resiliently against the shaft. If the liquid, such as a lubricant, enclosed in the space 8 is heated, for instance in consequence of an increase in speed or output, the heat is transmitted through the hollow interior of the casing 3 onto the bimetallic strips, which are curved increasingly by the rise in temperature and now relieve the sleeve 4 of part of the pressure exerted on it. Owing to this arrangement the frictional heat developed between the sleeve and the shaft can be kept correspondingly lower.

On the temperature dropping in consequence of a reduction of speed, or for other reasons, the pressure rises correspondingly, so that as required for a correct operation of the machine, the packing, when the machine comes to a still-stand, will seal the gap under the highest pressure.

Figure 2:
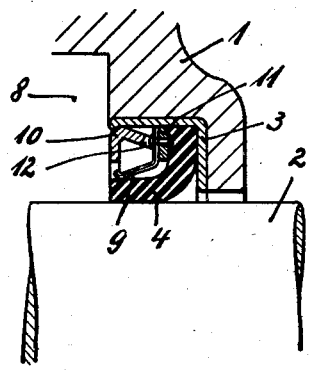

In the modification illustrated in Fig. 2 the bimetallic strips 9 are fixed with their outer ends, by means of the spacing ring 10, on the pressure ring 11 pressed against the radial outer portion of the sleeve 4 and extend through notches 12 of the ring 10, their free ends forcing the sleeve onto the shaft in a resilient manner.

Figure 3:
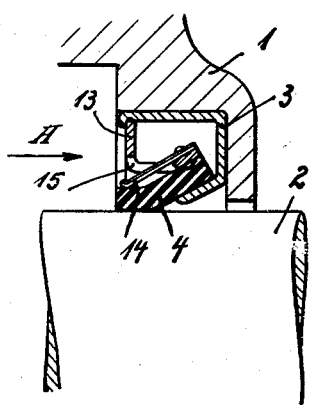
Figure 4:
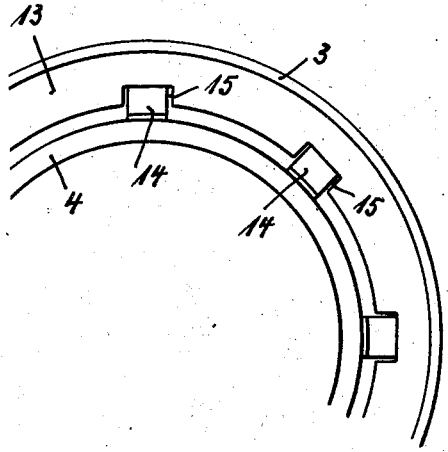
Fig. 4 is a partial view of the packing illustrated in Fig. 3, viewed in the direction of the arrow A.

A similar arrangement is shown in Figs. 3 and 4, where the ring 13 has the functions of both a spacing and a pressure ring, the bimetallic strips 14 being fixed with their outer ends to the ring and extending into contact with the sleeve through notches 15.

The combinations shown in Figs. 2 and 4 offer the advantage that the bimetallic strips are secured against displacement by the lateral edges of the notches, through which they extend, and that they are securely fixed in place by a bimetallic member and can readily be fixed to this member before the packing is mounted on the shaft.

In consequence of the lifting of the operative portion of the packing sleeve off the shaft, when the temperature rises, by means of the bimetallic strips which are uniformly spaced around the shaft, the circular form of the packing is slightly changed into a polygonal form, whereby the lubrication is rendered particularly effective.

In the modification illustrated in Fig. 5 the packing sleeve 16 is mounted in a well-known manner in a casing 17 and its radially extending outer portion 20 is pressed against the rear wall 18 of the casing by a pressure ring 19 of angular section and an intermediate ring 19. The pressure ring is retained in place in a known manner by the beaded edge 21 of the casing 17. The operative portion 22 of the sleeve, which extends partially in axial direction, is formed with a conical outer surface 23, onto which is applied an annular coil spring 24, which presses the operative portion 22 of the flange against the shaft 25. Angularly curved bimetallic strips 26 are fixed by their outer ends to the outer flange of the ring 18 and rest with their free ends on the coil spring 24. Whenever the strips are deformed in consequence of a rise of temperature, they also shift the spring 24 and thereby change the pressure exerted on the operative portion of the sleeve 22. For instance if the bimetallic strips 26 are bent inwardly as shown in dot and dash lines, the spring 24 is also shifted into the position shown in dot and dash lines along the conical surface 23 and the tension of the spring increased accordingly.

The modification illustrated in Fig. 6 is particularly suitable for use in cases where the spring shall be moved through larger distances. Here the bimetallic strips 27 are arcuate members extending partly around the shaft. They may for instance be fixed to the ring 18 at one end by spot welding, their free ends 28 being applied against the coil spring 24. On being heated, the bimetallic strips will be curved inwardly and will then force the spring back along the conical outer part of the packing sleeve.

In the modification illustrated in Fig. 7 the bimetallic strip 29 has the form of a corrugated annular spring, the free portions of which are applied against the coil spring, and, whenever the temperature changes, move the spring in one or the other direction. This bimetallic member can be loosely inserted between the pressure ring and the packing sleeve and is therefore particularly suitable to be mounted in normal packings, which can thus be rendered automatically responsive to temperature.

I wish it to be understood that I do not desire to be limited to the exact details of construction shown and described for obvious modifications will occur to a person skilled in the art.

I claim:

1. A shaft packing comprising in combination, a casing surrounding the shaft, an elastic packing sleeve or ring in said casing in contact with the shaft surface, an annular spring surrounding the operative portion of the packing sleeve or ring and bimetallic members arranged in a circle in said casing to change the position and the pressure exerted by said annular spring on said sleeve or ring in response to changes in working temperature.

2. The packing of claim 1, in which the annular spring is a coil spring.

3. The packing of claim 1, in which the operative portion of the packing sleeve or ring presents a conical outer surface which is surrounded by the spring and in which the bimetallic members are arranged to shift the spring on this conical portion in proportion to variations of temperature.

4. The packing of claim 1, in which a pressure ring of annular cross section is mounted in the casing and a plurality of angularly curved bimetallic strips are fixed to the outer portion of said pressure ring by one end, while their inner ends are applied against the spring to exert pressure thereon.

5. The packing of claim 1, in which a pressure ring of angular cross section is mounted in the casing and a plurality of arcuate bimetallic strips are arranged in a circle, one end of each strip being secured to the outer portion of said pressure ring, while the other end is applied against the spring to exert pressure thereon.

6. The packing of claim 1, in which a corrugated bimetallic ring is inserted between the elastic sleeve or ring and the spring.

7. In machinery packing for sealing the opening between two relatively movable machine parts comprising a packing member of flexible, oil sealing material having a body portion adapted to be disposed in stationary leak-tight relation with respect to one of the machine parts, a flexible sealing lip portion adapted to wipe against the other of the machine parts; and means for imposing spring pressure upon the sealing lip portion urging it into engagement with such other machine part and providing for reducing such spring pressure in response to heat generated by such engagement during operation, such means comprising a resilient spring element engaging the sealing lip of the packing to press it yieldingly against such other machine part, said spring comprising two superposed layers of dissimilar metals having materially different coefficients of thermal expansion, bonded together along their abutting faces, and arranged with the layer of metal having the higher coefficient disposed adjacent the sealing lip of the member so that heat produced by the wiping of the sealing lip against the machine part during operation will cause a flexing of the spring in such direction as to reduce the spring pressure which it exerts against the sealing lip.

WILHELM HAUG.